United States Patent
Panfili

[15] 3,640,317
[45] Feb. 8, 1972

[54] CLIP FOR CLOSING FRAGILE STUFFED CASINGS

[72] Inventor: Jack Panfili, 1576 61st St., Brooklyn, N.Y. 11219

[22] Filed: Mar. 21, 1969

[21] Appl. No.: 813,799

Related U.S. Application Data

[63] Continuation-in-part of Ser. No. 749,404, Aug. 1, 1968, abandoned.

[52] U.S. Cl. ...................................140/82, 24/20, 24/27, 59/77
[51] Int. Cl. ...........................................B21f 45/22
[58] Field of Search ........................140/82; 24/20, 27, 30.5; 59/71, 72, 73, 74, 75, 76, 77; 29/13, 243.56

[56] References Cited

UNITED STATES PATENTS 2,760,262  8/1956  Homan..........................24/20
3,429,605  2/1969  Soesbergen..................24/20

Primary Examiner—Lowell A. Larson
Attorney—Jay M. Cantor

[57] ABSTRACT

A clip for use in closing the ends of sausage casings and similar containers. The clip is formed as a U with legs having angularly bent portions. The zone of joinder of the legs with the base is work hardened to a degree that will resist bending by lateral forces which will produce bending at the angularly bent zones of the legs. In another form of the invention the clip is formed into a U and is of channel cross section. One leg of the U is dimensioned to slidably fit between the other legs of the U when the clip is applied to a casing. In either form of the invention the clip is preferably made of anodized aluminum or coated with a lubricant of synthetic resin or both and in each case dyed a suitable color.

12 Claims, 13 Drawing Figures

PATENTED FEB 8 1972
3,640,317
SHEET 1 OF 2
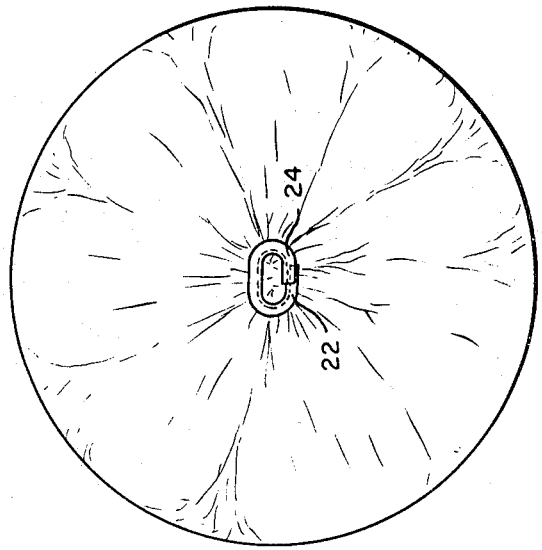
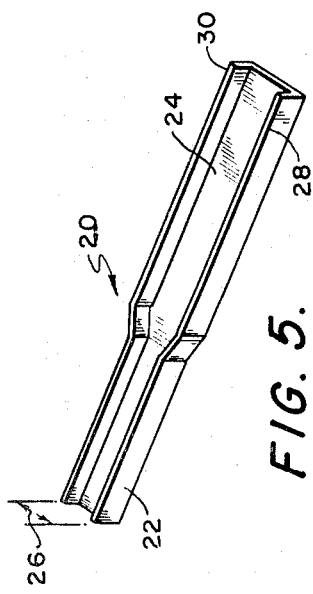
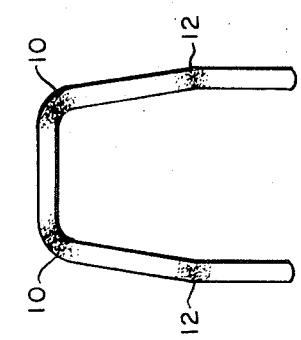
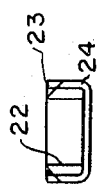
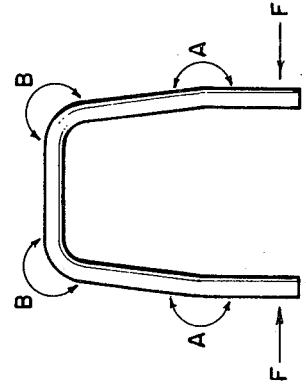
INVENTOR
JACK PANFILI
BY Harold L. Halpert
AGENT

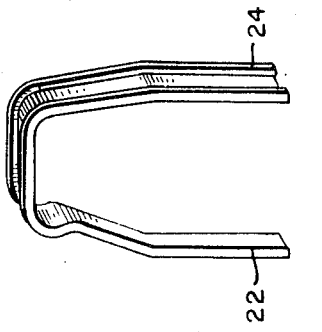
FIG. 6.
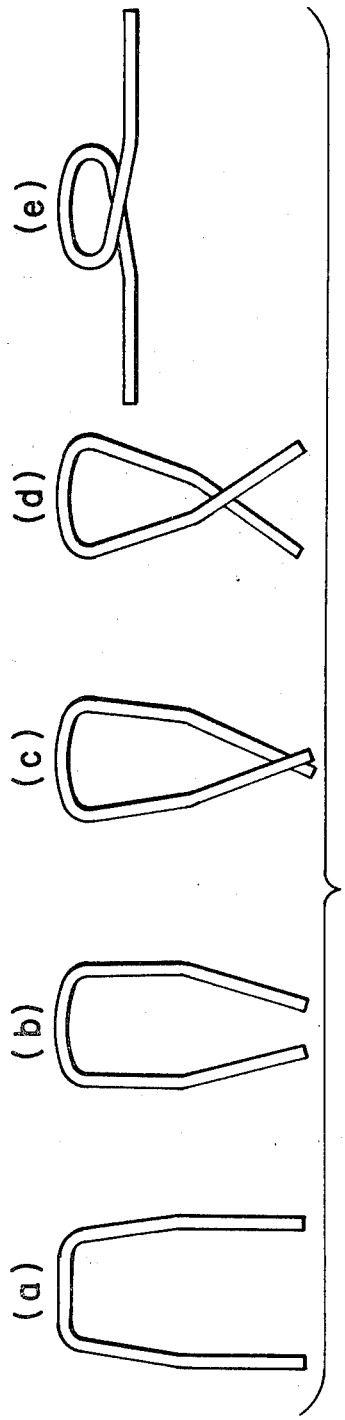
FIG. 9.
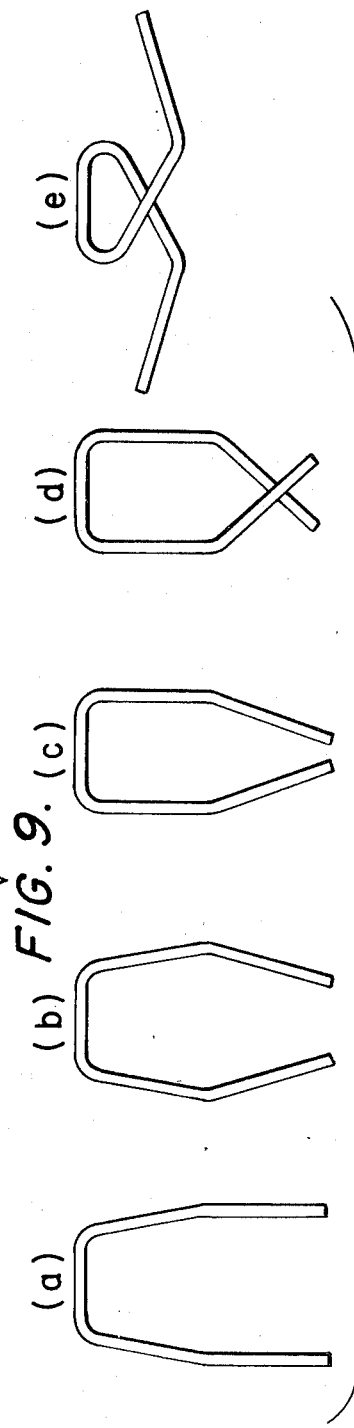
FIG. 10.
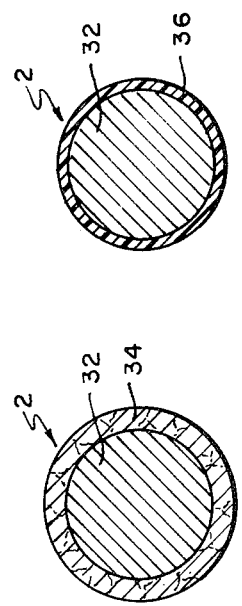
FIG. 11.
FIG. 12.
FIG. 13.
INVENTOR
JACK PANFILI
BY Harold L. Halpert
AGENT

CLIP FOR CLOSING FRAGILE STUFFED CASINGS

This application is a continuation-in-part of my application Ser. No. 749,404, filed Aug. 1, 1968 now abandoned.

This invention relates to a closure for use in closing the ends of sausage casings, paper bags, and other containers and more particularly relates to a clip that can be applied without damaging the casing and will maintain its position without slipping from the closure position.

In my U.S. Pat. No. 3,026,521 there is disclosed a clip of similar form to that disclosed in this application but which has a tendency in a good percentage of applications to damage the casing as it is being applied and has a tendency to become loose and slip from the closure position.

It is an object of this invention to provide a clip which can be bent into closure position without damaging the container.

It is a further object of this invention to provide a clip as aforesaid which can maintain sufficient mechanical strength after bending to remain fastened in the applied closure position.

Further objects of invention are to provide an anodized clip with a hard surface case which will act to maintain the integrity of the cross section of the material in the case and act as a lubricant; to provide a synthetic resin coating to act as a lubricant while the clip is being formed; and to dye the clips with various colors to readily identify the casings to which they are applied.

These and other objects of the invention will become manifest upon reading the following description in conjunction with the accompanying drawing wherein:

FIG. 1 illustrates a rod before it is formed into the clip,

FIG. 2 illustrates the rod after it has been bent in accordance with the first step of manufacture of the clip, FIG. 3 shows the finished clip, FIG. 4 discloses the areas which have been work hardened, FIG. 5 shows the starting shape of another form of clip, FIG. 6 illustrates the clip formed from the shape disclosed in FIG. 5, FIG. 7 shows the clip shown in FIG. 6 applied to a stuffed casing, FIG. 8 illustrates the structure for locking the clip shown in FIG. 6 in its closure position, FIG. 9 illustrates several shapes assumed in the bending of the clip disclosed in my U.S. Pat. No. 3,026,521, FIG. 10 illustrates several shapes assumed in the bending of the clip shown in FIGS. 1-4, FIG. 11 is a cross section of the rod of FIG. 1 on an enlarged scale and showing an anodized surface with an exaggerated thickness, FIG. 12 is a cross section of another embodiment of the rod of FIG. 1 on an enlarged scale and showing a synthetic resin coating with an exaggerated thickness, FIG. 13 is a cross section of still another embodiment of the rod of FIG. 1 on an enlarged scale showing an anodized surface and a synthetic resin coating with an exaggerated thickness.

In accordance with the invention the portion of the clip connecting the legs of the U to the base are work hardened to a degree that will prevent bending of this portion until other selected portions of the legs have been bent during the application of the clip. In another form of the invention the legs of the clip are interdigitated and then deformed to lock the legs together.

In FIG. 1 there is disclosed a rod 2 of circular cross section which has been cut from a piece of metal of indefinite length to provide the proper length for the completed clip. The rod is bent at the zones A and B as illustrated in FIG. 2 to form a base 4 and legs having angularly related portions 6 and 8. The bent rod of FIG. 2 is then bent in the opposite direction at zones B to form the final shape shown in FIG. 3. The reverse bending at the zones B produces work hardened zones, such as illustrated by the stippled zones at 10 in FIG. 4, which are greater in hardness than that which would be obtained from merely bending the straight rod 2 directly into the shape illustrated in FIG. 3. The bending of the legs at zones A produces work hardened zones as shown by the stippled zones 12 which are of the hardness produced by a merely simple bending. The amount of work hardening at zones B is determined by the amount of reverse bending and is so chosen that forces F shown in FIG. 2 which are directed to urge the free ends of the legs together will bend the legs at zones A such as illustrated in FIG. 10(b) before producing any bending at zones B.

In FIG. 9 there is illustrated at (a) a clip such as disclosed at 15 in my aforementioned patent. As this clip is applied to a container it initially forms a vertically elongated envelope enclosing the oval area between the legs and base such as shown at FIGS. 9(b), (c), and (d). The final steps of bending the clip produce a horizontal enclosure embracing the oval area as shown at FIG. 9(e). The initial formation of the vertical oval and the final formation of the horizontal oval produce an initial shearing of the container by the scissors action of the legs as at (b), (c), and (d) and then a crushing into a lateral oval as at (e). This action of the clip produces a number of damaged casings. In contrast, with the improved clip, as shown in FIG. 10, the lower portions of the legs are bent inwardly before the upper portions of the legs thus pushing the material of the casing towards the upper part of the clip which continues in a relatively constant and unrestricted state as shown in FIG. 10(b), (c), (d) in comparison with FIG. 9(b), (c), (d). The transition of the material of the casing to the final crushed state in FIG. 10(e) is thus made easier and the initial shearing action on the material is reduced whereby damage to the casing is avoided.

The clip of the instant invention also exhibits a greater tendency to maintain its holding action in the closure position since the forces tending to unwind the clip are resisted by the extra work hardened zones B.

In FIGS. 5 and 6 there is illustrated another form of the invention in which a channel section 20 is formed with portions 22 and 24. The portion 22 has an outer lateral dimension 26 which is of a size to be slidably received in between the legs 28, 30 of portion 24. The channel is bent into the shape of a U as illustrated in FIG. 6. When this clip is bent around a container as shown in FIG. 7 the legs are interfitted and margins of the interfitted portions are displaced as shown at 23 by pressing or striking to lock the parts together.

The clips are formed from aluminum wire but could also be formed from other similar deformable metallic material.

In FIG. 11 the wire 2 of FIG. 1 is shown as comprising a core 32 of aluminum which has been anodized to produce a hard aluminum oxide case or surface coating 34. This coating, as shown in FIG. 11, has numerous minute interstices, pores, cavities or fissures. The case 34 acts as a lubricant to prevent spalling or chipping of the forming die or anvil while the clip is being bent to its final shape. The case 34 also functions to maintain the integrity of the cross section of core 32 while the clip is being bent into its final shape.

In FIG. 12 another embodiment of wire 2 is shown in which core 32 is covered with a thin coating 36 of polytetrafluoroethylene (Teflon), ureaformaldehyde, melamine, epoxy resin or the like synthetic resin which has a surface having a low coefficient of friction to act as a lubricant to prevent spalling or chipping of the forming die or anvil while the clip is being bent to its final shape.

In FIG. 13 still another embodiment of wire 2 is shown in which aluminum core 32 is anodized to form a hard aluminum oxide case 34 which is covered with a thin synthetic resin coating 36, made of the already enumerated materials. The intersticia or fissures of the aluminum oxide case receive the material of coating 36 and act to bond it to the case 34 and core 32. The low coefficient of friction of the coating 36 enables it to act as a lubricant during bending of the clip to its final shape and the hard oxide case 34 tends to maintain the integrity of the cross section of the core 32 while the clip is being bent to final shape.

In each of the embodiments of FIGS. 11, 12 and 13 the wire 2 may be dyed to have various distinctive colors whereby the various casings to which the clips are applied may be coded for ready identification by the differently colored clips applied to them. In FIG. 11 the dye is applied to anodized surface 34, in FIG. 12 the dye is applied to the resin coating 36 and in FIG. 13 the dye may be applied to the anodized surface 34 if the resin coating is transparent or to the resin coating 36. After core 32 has been coated as shown in FIGS. 11, 12 or 13 the wire 2 is bent as shown in FIGS. 2 and 3.

Though FIGS. 11, 12 and 13 are limited to wire 2 the dyed, anodized case or coating 34 and the dyed, synthetic resin coating 36 are equally applicable to the channel 20 of FIG. 5 which is then bent to the shape of FIG. 6.

I claim:

1. A U-shaped clip comprising a base and legs bent laterally therefrom, each leg comprising angularly bent portions, the hardness of the material at the zone of joinder of base and legs being greater than the hardness of the material at the zone of the joinder of the bent portions of the legs by an amount such that forces urging the free ends of the legs together will cause bending at the zone of joinder of the bent portions of the legs before producing bending at the zone of greater hardness.

2. A clip as in claim 1 in which the material of the clip comprises an aluminum core having an anodic coating.

3. A clip as in claim 2 in which the coating is colored.

4. A clip as in claim 1 in which the material of the clip comprises an aluminum core having a coating of synthetic resin.

5. A clip as in claim 4 in which the coating is colored.

6. A U-shaped ligature clip comprising an outwardly facing channel having a pair of legs connected to a straight bight portion, the inner lateral dimension of the channel of one leg being larger than the outer lateral dimension of the other leg whereby the legs can be slidably interfitted at the end zones thereof.

7. A clip as in claim 6 in which the material of the clip comprises an aluminum core and a lubricating coating on the core.

8. A method for forming a U-shaped clip comprising the steps of bending a rod in one direction in a plane to form a base and legs extending laterally therefrom with said legs having angularly related portions, then bending the legs only at the zone of joinder with the base in a direction opposite said one direction and to a preselected angle to form the selected shape of clip.

9. The method of claim 8 comprising the step of anodizing and coloring the rod before said bending steps.

10. The method of claim 8 comprising the steps of coating the rod with a synthetic resin having a low coefficient of friction and coloring the resin before said bending steps.

11. A ligatured joint for a sausage casing comprising a channel-shaped clip constricting the wall of the casing to form a stricture to prevent the escape of filling from the casing, the ends of the clip being interfitted, and means securing the ends to prevent separation.

12. A joint as defined in claim 11 wherein the means securing the ends comprises interlocking segments formed on the interfitted ends.

\* \* \* \* \*